United States Patent [19]
Kakihara et al.

[11] Patent Number: 6,118,608
[45] Date of Patent: Sep. 12, 2000

[54] DISK DRIVE UNIT AND ERROR RECOVERY METHOD EXECUTING SHORTER ERROR RECOVERY PROCEDURE WHEN WRITE ERRORS AND RESET INSTRUCTION OCCUR

[75] Inventors: Toshio Kakihara, Fujisawa; Atsushi Kanamaru; Takumi Satoh, both of Sagamihara; Masahiko Satoh, Yokohama, all of Japan

[73] Assignee: International Business Machines Corporation, Armonk, N.Y.

[21] Appl. No.: 09/035,679

[22] Filed: Mar. 5, 1998

[30] Foreign Application Priority Data

Mar. 12, 1997 [JP] Japan ................................. 9-057751

[51] Int. Cl.[7] .............................. G11B 5/09; G11B 27/36; G11B 3/90
[52] U.S. Cl. ................................. 360/53; 360/31; 369/53
[58] Field of Search ......................... 360/31, 53; 369/53; 371/40.15

[56] References Cited

U.S. PATENT DOCUMENTS 5,721,816  2/1998  Kusbel et al. ............................ 360/53

*Primary Examiner*—W. Chris Kim
*Attorney, Agent, or Firm*—G. Marlin Knight

[57] ABSTRACT

A disk drive unit and an error recovery method for the disk drive unit which can reduce processing time for ERP in resetting, thereby shortening response time to the reset is described. A normal error recovery procedure is executed if there is no reset request when a write error occurs, but if there is a reset request pending, a data record in which a write error occurs is registered as a defective position (e.g. sector) and an alternate (spare) position is assigned to accelerate the time when the drive can respond to the reset instruction. Data records with alternate positions assigned as a part of the reset activity are specially marked so that alternate position assignment can be undone as soon as is appropriate, for example, when the record is next read or written.

15 Claims, 4 Drawing Sheets

MAX : 819.   #ENTRY : 05.   #SPAREUSED : 05.

| [LBA]    | [SPARE] | CAN | RE | WE | RRE | RST |
|----------|---------|-----|----|----|-----|-----|
| 001FB770 | 0000    | 0   | 0  | 1  | 0   | 0   |
| 001FB771 | 0001    | 0   | 1  | 0  | 0   | 0   |
| 001FB772 | 0002    | 0   | 0  | 1  | 0   | 0   |
| 001FB773 | 0003    | 0   | 0  | 0  | 1   | 0   |
| 003DA124 | 0004    | 0   | 0  | 0  | 0   | 1   |

CAN: REASSIGNED WHEN WRITE IS PERFORMED TO LBA RECORDED AS A HARD ERROR IN READ

RE: (TENTATIVELY) REASSIGNED BECAUSE OF A HARD ERROR IN READ

WE: REASSIGNED BECAUSE OF A HARD ERROR IN WRITE

RRE: RECOVERED IN READING, BUT REASSIGNED BECAUSE IT MAY BECOME A HARD ERROR IN THE NEXT READ

RST: TENTATIVELY REASSIGNED BY A RESET REQUEST IN WRITE ERP

FIG. 3

DISK DRIVE UNIT AND ERROR RECOVERY METHOD EXECUTING SHORTER ERROR RECOVERY PROCEDURE WHEN WRITE ERRORS AND RESET INSTRUCTION OCCUR

BACKGROUND OF THE INVENTION

1. Field of the Invention

The present invention relates to a disk drive unit used mainly as an auxiliary storage device of an information processing system and an error recovery procedure for it, and, more particularly, to a disk drive unit for increasing response speed when reset is requested from the information processing system and an error recovery procedure for it.

2. Background

A fixed disk drive, which is used as an auxiliary storage device of an information processing system, is typically provided with a cache memory for temporarily storing data supplied from the information processing system, and a controller for performing cache control or the like to improve access speed.

When data to be written (write data) is supplied from the information processing system, the controller holds the supplied write data in the cache memory, and releases the information processing system from write processing. Concurrently, the controller controls a writing system such that the write data held in the cache memory is sequentially written in a magnetic disk. Furthermore, in parallel to these operations, the controller instructs a reading system to read from the magnetic disk of data which is expected to be read requested by the information processing system, and holds the read-out data in the cache memory. Then, when the information processing system issues a read request, if the data subject to read is held in the cache memory, it is supplied to the information processing system. With such cache control, apparent access speed is improved for the magnetic disk drive.

When a write is performed from the cache memory to the magnetic disk, the controller instructs reading of the written data, monitors whether or not the write is normally performed, and, if a write error occurs, performs error recovery procedure (ERP).

The ERP repeats the write several times while changing the write parameters. If the write is successful after this, the ERP is terminated. If the write error cannot be eliminated even after repeating the write in a predetermined number of times or more, the region (sector) in which the write is performed is determined to be defective, registered in a reassignment table, and assigned with a spare sector which is an alternate to the sector in question. Thereafter, when there is a write/read request to the defective sector, write/read is performed to the assigned spare sector.

Recently, the occasions when the entire system is reset have increased in installing or restarting an operating system (hereinafter simply called "OS") or an application software. In such resetting, after all data held in the cache memory are written to the magnetic disk, the controller notifies the OS of reset ready, and, then the OS resets the system. For resetting by the OS, an upper limit of processing time is established. If no reset ready notification is issued from the fixed disk drive during this time, it causes a timeout, which is determined to be an error.

On the other hand, as the cache technology is recently advanced, it is not rare that a cache memory with large capacity holds as much as several hundred sectors of data to be written in random sectors. In resetting as described above, a reset ready cannot be notified until all such data are written in a magnetic disk. In addition, when such much data is written in the random regions, there may arise a case where write fails in a plurality of sectors, and the ERP should be performed in a number of times. Furthermore, if the write condition is poor due to deterioration of a recording medium or head characteristics by aging, a power supply, or vibration, it is expected that write failure frequently occurs. In such case, a long period of time is required until all ERP complete, and the reset ready notification is significantly retarded, leading to timeout of the OS.

Therefore, the object of the present invention is to reduce processing time for ERP in resetting, thereby shortening response time to the reset.

SUMMARY OF THE INVENTION

A disk drive unit according to the present invention comprises a disk recording medium, a write controller for writing data externally supplied in a selected position on the disk recording medium, a write error detector for detecting a write error occurring in the writing operation by the write controller, a reset detector for detecting whether or not reset is externally instructed, and an error recovery processor for executing a first error recovery procedure by controlling the write controller when the write error detector detects a write error, and for executing a second error recovery procedure having less execution instructions by controlling the write controller when the reset detector detects a reset instruction.

In addition, an error recovery method for a disk drive unit according to the present invention comprises the steps of detecting a write error; detecting a reset command from outside; and executing error recovery procedure for executing a first error recovery procedure if a write error is detected, and for executing a second recovery procedure having less error recovery steps if a reset command is detected.

The first error recovery procedure may be, for example, performing a rewrite in a sector on the disk recording medium on which the write has been performed (write sector), not assigning an alternate sector for the write sector if write is successfully performed in a predetermined number or less of rewrites, and assigning an alternate sector for the write sector if a write error is detected even after rewrite is performed in more than the predetermined number of times. In addition, the second error recovery procedure may be attained, for example, by treating the write sector as defective, and assigning an alternate sector to which data is written in place of the sector by controlling the write controller. Preferably identification information (flag) will be recorded indicating that the alternate sector was assigned as a result of error handling when a reset instruction was pending. This flag allows the system to reverse the alternate sector assignment at an appropriate time in the future such when the sector is next read or written.

When a write or a read is instructed for an alternate sector corresponding to a write sector recorded in the reassignment table, it may be attained by referencing the identification information, detecting whether or not the write sector assigned with the alternate sector is the write sector that is tentatively assumed to be defective, reading data recorded in the alternate sector if the write sector is the write sector that is tentatively assumed to be defective, rewriting the read-out data in the write sector that is tentatively assumed to be defective, and deleting a record on said write sector in the table if write is successfully performed by rewrite in a predetermined number of times or less.

BRIEF DESCRIPTION OF THE DRAWINGS

FIG. 3 is a diagram showing an example of reassignment table; and

DETAILED DESCRIPTION OF THE PREFERRED EMBODIMENT

Figure 1:
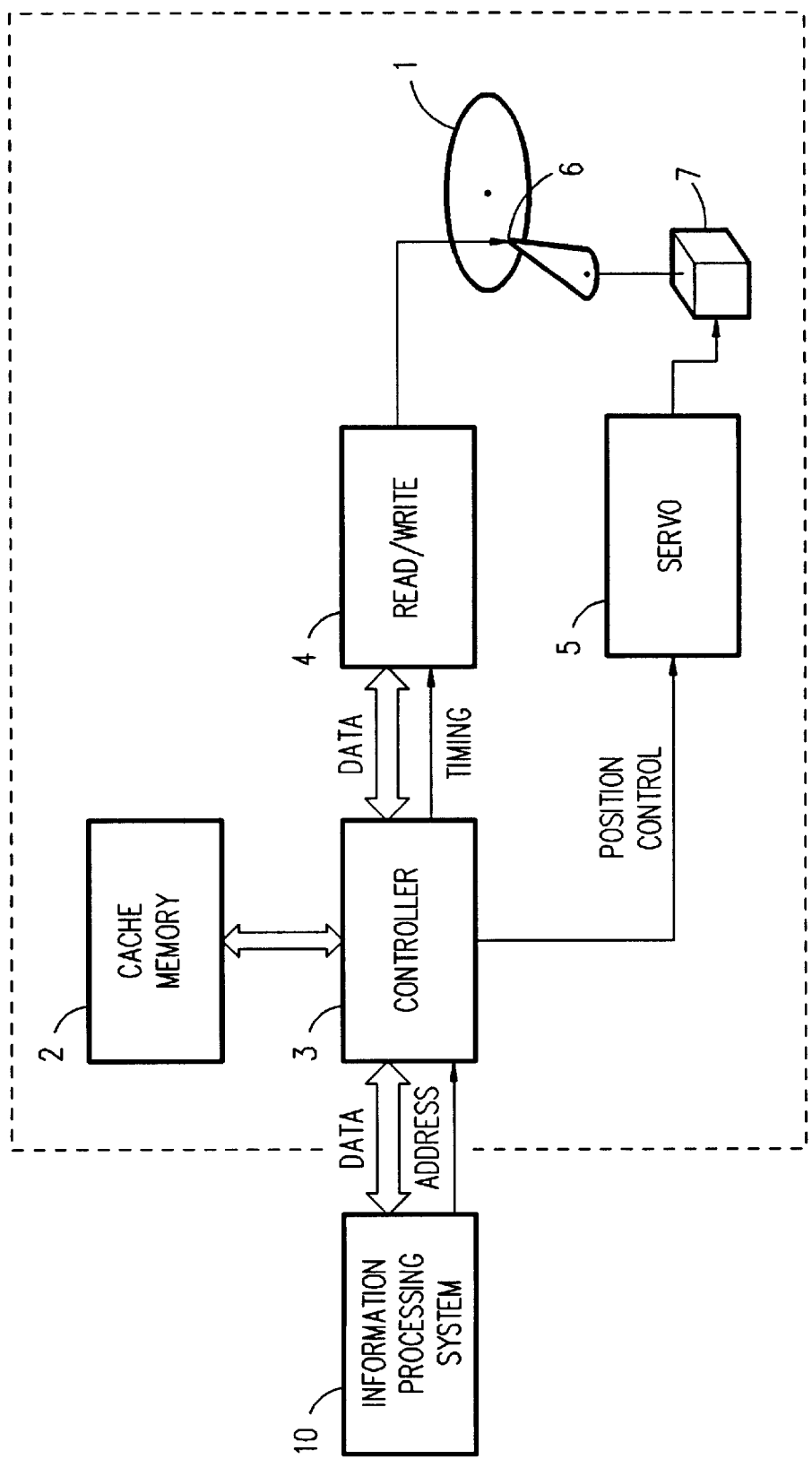
FIG. 1 is a block diagram showing the arrangement of a fixed disk drive which is an embodiment of the present invention.

FIG. 1 is a block diagram showing the arrangement of a fixed disk which is an embodiment to which the present invention is applied.

The fixed disk drive comprises a magnetic disk 1 for recording data, a cache memory 2, a controller 3 for controlling the operation of the entire fixed disk drive such as write/read of data, a read/write system 4 for reading/writing data from or to the magnetic disk 1 under control of the controller 3, a servo system 5 for controlling a read/write position with the read/write system 4 under control of the controller 3, a head 6 for reading/writing the magnetic disk 1, and a head drive mechanism 7 for moving the head 6 under control of the servo system 5.

The cache memory 2 has a storage capacity capable of holding data, for example, for several hundred recording units (sectors) or more on the magnetic disk 1.

The controller 3 comprises a processor for executing a controller program, the controller program, a memory for holding data or the like (reassignment table). The controller 3 controls the operation of the entire fixed disk drive by executing the controller program, and performs read/write from or to the magnetic disk 1 based on commands, data or the like supplied from an information processing system.

The controller 3 is arranged to be capable of concurrently executing a plurality of processes, one of which is to control input/output of commands and data to or from the information processing system 10, another one of which is a write cache process for writing write data held in the cache memory 2 to the magnetic disk 1, and still another one of which is a read cache process for reading from the magnetic disk 1 data anticipated to be read from the information processing system and holding it in the cache memory 2. Although other several processes are concurrently executed, they are not directly related to the present invention and omitted for description.

In the input/output controller process for the information processing system 10, when the controller 3 is supplied from the information processing system 10 with a command requesting write of data, an address instructing a write destination (a sector on the magnetic disk 1) (for example, a logic block address LBA), and write data, it releases the information processing system 10 from the write operation after holding the supplied write data in the cache memory 2. In addition, when it is supplied from the information processing system 10 with a command requesting read of data and an address where the data to be read is stored, it supplies the read requested data to the information processing system if the read requested data is read from the magnetic disk 1 and held in the cache memory 2, and instructs the read/write system 4 of reading of the read requested data if it is not held in the cache memory 2.

In the write cache process, the controller 3 sequentially reads the write data which is supplied from the information processing system 10 as described above, and held in the cache memory 2, supplies it to the read/write system 4, and instructs write to the magnetic disk 1.

In addition, in the read cache process, the controller 3 instructs the read/write system 4 to read data which is anticipated to be requested for reading from the information processing system 10, and holds the read-out data in the cache memory 2.

Here, the write cache process which is one of features of the present invention is described in detail with reference to the flowchart shown in FIG. 2.

In the write cache process, the controller 3 first detects in step S1 whether or not write data is held in a sector for write data in the cache memory 2 (write command queue), and waits in step S1 if it is not held. If the write data is held in step S1, the process proceeds to step S2, and instructs writing of the write data for one sector held in the cache memory 2. Specifically, the controller 3 reads the write data for one sector from the cache memory 2, supplies it to the read/write controller 4, reads an address corresponding to the write data from the cache memory 2, and supplies to the servo system 5.

The controller 3 monitors whether or not the writing of the data successfully completes. That is, in step S3, the controller 3 detects whether or not the write operation successfully completes, and, if so, returns to step S1 to continue writing of data. If write operation does not complete, the controller 3 determines in the subsequent step S4 whether or not it is a write error. If not, it returns to step S3, and repeats determination on whether or not write operation completes.

If it is a write error, the controller 3 executes an error recovery procedure (first error recovery procedure or ERP) from steps S5 through S9.

In the ERP, the controller 3 controls the servo system to vary offset of the write (head) position from the reference position; or controls the read/write system to change the write parameters such as filter characteristics, repeats write operation several times, and, if the write operation is successful with it, completes the ERP (step S8). However, if write operation fails for a predetermined number of times or more, the written sector (a unit for data write) is determined to be defective, registered in a reassignment table as shown in FIG. 3, and completes after assignment of a spare sector (for example, a sector on the innermost track) which is an alternate of the sector in question (step S6).

The reassignment table is recorded with, as shown in FIG. 3, an address [LBA] of the sector determined to be defective, an address [SPARE] of the corresponding spare sector address (relatively represented by a pointer from the reference address), and flags (CAN, RE, WE, PRE, RST) indicating status where the error occurs. The reassignment table is referenced and updated by not only the write cache process, but also other processes. The reassignment table is recorded, for example, in a predetermined sector on the magnetic disk 1, or in a nonvolatile memory provided in the controller 3. During the operation of the fixed disk, the table is held in the memory of the controller 3 to increase the speed of operation.

Once a spare sector is assigned to the sector determined to be defective, as described above, then if there is a write/read request to the defective sector, write/read is performed to the assigned spare sector.

The ERP process is executed one step after another for the fixed disk drive as steps S5 through S9 are repeatedly executed.

Specifically, the controller 3 first detects in step S5 whether or not reset is instructed by the information processing system 10. If so, the process proceeds to step S10, while, if not, it proceeds to step S6.

In step S6, the controller 3 determines whether or not all of the ERP process is complete, and the reassignment table is updated. If so, it returns to step S1. If not, the controller 3 proceeds to step S7, and executes one step of the remaining ERP process.

In step S8, the controller 3 confirms whether or not the error is eliminated by the process executed in step S7. If so, it returns to step S1, while, if not, it proceeds to the next step of the ERP in step S9, and then returns to step S5.

As described, every time the process from steps S5 through S9 is repeated, and the process of step S7 is executed, rewrite is performed by changing, for example, a write parameter, or a spare sector is assigned when rewrite is repeated in the predetermined number of times or more.

In addition, for the fixed disk drive, when reset is requested, the normal ERP as described above is not executed, or interrupted, a sector in which a write error occurs being registered as tentatively assuming it to be defective, a spare being assigned to update the reassignment table, write data for the sector assumed to be defective being written in the spare sector before starting write of the next data (second error recovery procedure).

Specifically, if reset is requested in step S5, the controller 3 interrupts the ERP, or does not execute it, proceeds to step S10 where the selected sector is assumed to be defective, and tentative registration of defective sector is started. Then, in the subsequent step S11, a spare sector is assigned to update a reassignment defect map table (RDM). In this case, deferring from the above-mentioned ERP, the RST flag is set to "1," the RST flag being one of flags indicating occurrence status of an error in the reassignment table shown in FIG. 3 and indicating that it is tentative assignment during reset.

Then, the controller 3 proceeds to step S12 where write data corresponding to the sector assumed to be defective is written in the assigned spare sector, and returns to step S1 where write process is started for another sector.

Figure 2:
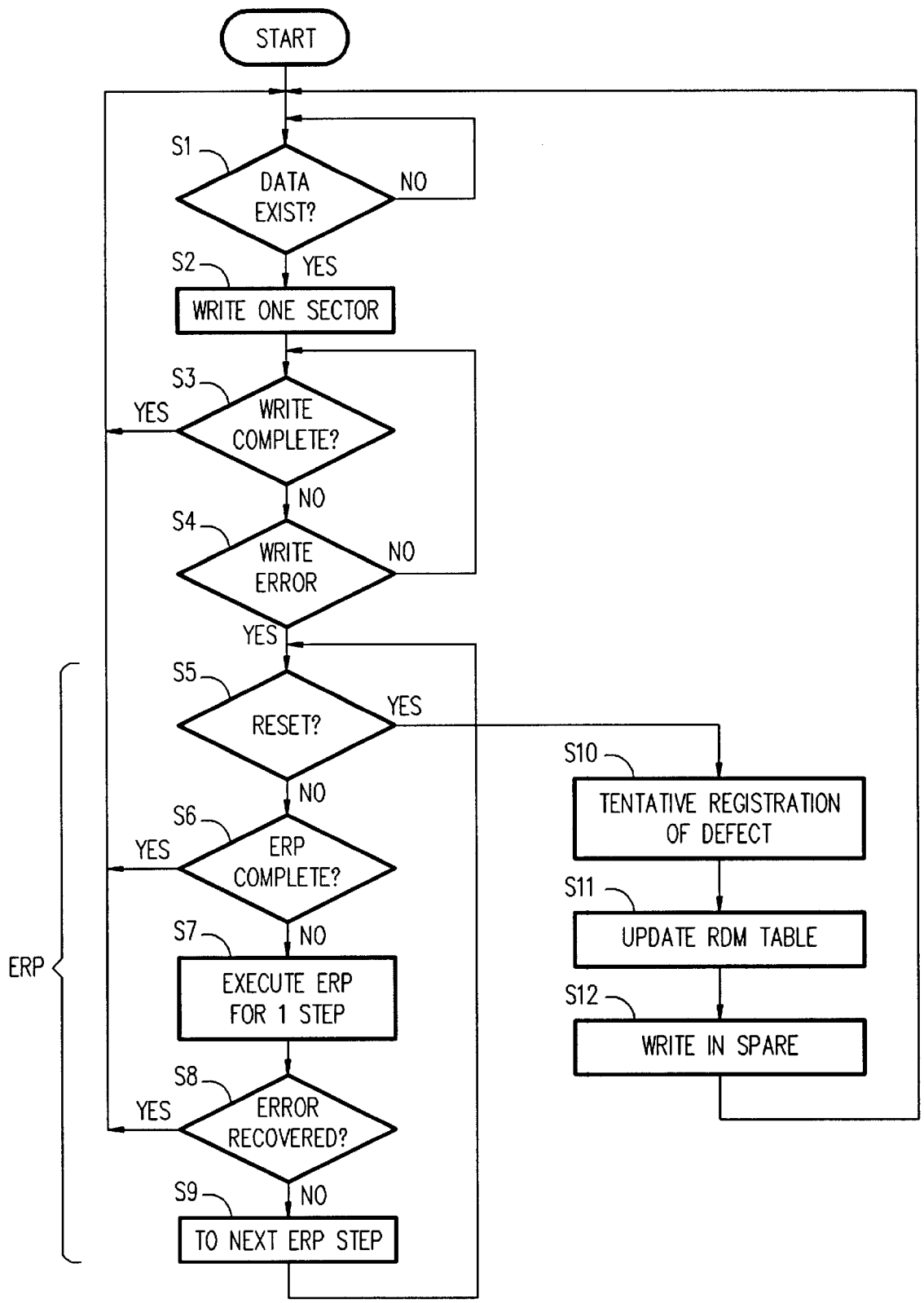
FIG. 2 is a flowchart showing the operation of write cache process.

Here, since the normal ERP where the reset is not requested executes steps S5 through S9 in FIG. 2 for a number of times (for example, repeating about 100 times), the number of steps actually executed becomes very large. On the other hand, when reset is requested, a spare sector is assigned by assuming the sector in which an error occurs to be defective, and steps S5, and S10 through S12 are executed only once before other sectors starts to be processed. Since the number of execution instructions executed by the processor in the controller 3 depends on the number of steps, the period of time required for execution of the process shown in FIG. 2 significantly differs for a case where reset is requested or not.

In addition, in a case where a fixed disk 1 drive has a magnetic disk with the number of revolution of 5,400 rpm, execution of one step of the ERP requires time of about 11 ms in average (substantially equal to latency time before reading data in the written sector). Accordingly, when the number of repetition of ERP is n, if a write error occurs in one sector, maximum processing time of ERP becomes as follows for this sector.

$$TR1(\text{total write time}) = 11 \text{ ms} \times n$$

On the other hand, when the reassignment table (recorded in the magnetic disk) is updated to perform write in the assigned spare sector without executing the normal ERP as in the operation from steps S10 through S12 in FIG. 2, if the average access time is about 16.5 ms (sum of average seek time of head and average latency time) for a fixed disk drive similar to the above, the processing time for it becomes as follows.

$$TR2(\text{total processing time}) = 16.5 \text{ ms} \times 2$$

When controller is not provided for execution of ERP according to whether or not reset is requested as shown in FIG. 2, since the ERP is executed even when reset is requested, time corresponding to TR1 described above is required until reset ready is notified.

Therefore, time TD reduced by controlling execution of ERP according to whether or not reset is requested as shown in FIG. 2 becomes as follows:

$$TD = TR1 - TR2 \approx (11 \text{ ms} \times n) - (16.5 \text{ ms} \times 2)$$

Here, total write time differs for a case where ERP is executed, and a case where ERP is not executed, but a spare sector is tentatively assigned. However, in general, write time is negligible for latency time, and therefore omitted.

Therefore, if the number of repetition n of ERP is 100, the reduced time TD is 11 ms 100−16.5 ms 2=1067 ms, or about one second. This time is for the ERP for one sector.

When reset is requested from the information processing system 10, not to lose the write data held in the cache memory 2, the controller 3 should notify reset ready after all write data held in the cache memory 2 is written in the magnetic disk 1. In such a case, write error may occur in a plurality of sectors. For example, if write errors occur in m sectors during resetting, there arises a difference of m seconds until reset ready is notified between a case where ERP is performed and a case where the sectors in which the write errors occur are tentatively registered as defective sectors, as described above.

Difference of execution time based on this difference and the difference in the number of execution instructions described above causes the fixed disk drive to significantly reduce the processing time when reset is requested compared to a case where normal ERP is performed. Thus, the fixed disk drive can shorten the response time (i.e., the time until the reset ready is notified) when reset is requested.

In particular, there may be a case where a number of ERP are executed in a device that can hold in the cache memory 2 a number of write commands or write data (for example, for several hundred sectors) for random positions (sectors) on the magnetic disk 1. In addition, a number of write errors may also occur in a case where the operating environment is poor due to deterioration of the recording medium or head characteristics by aging, failure of power supply, or vibration.

When execution of ERP is not controlled as described above, processing time may become very long for ERP if a number of write errors occur, delaying a response for the request of reset, and causing timeout of the OS. However, if execution of ERP is controlled as described above, the response time for reset can be significantly reduced even for such a case, so that the above problem can be avoided.

However, if the defective sectors tentatively registered are left as they are, it causes shortage of spare sector capacity, or lowering of access speed. Shortage of spare sector capacity is generally caused because the spare sector capacity is limited. Lowering of access speed is caused because the head must be moved to the spare sector provided, for example, on the innermost track every time an access is requested for a sector assigned with the spare sector.

Then, when read or write is performed for a sector assumed to be defective and tentatively registered, the fixed disk drive performs the normal ERP for the tentatively registered sector, and changes the tentative registration to normal registration based on the result, or releases the tentative registration.

Figure 4:
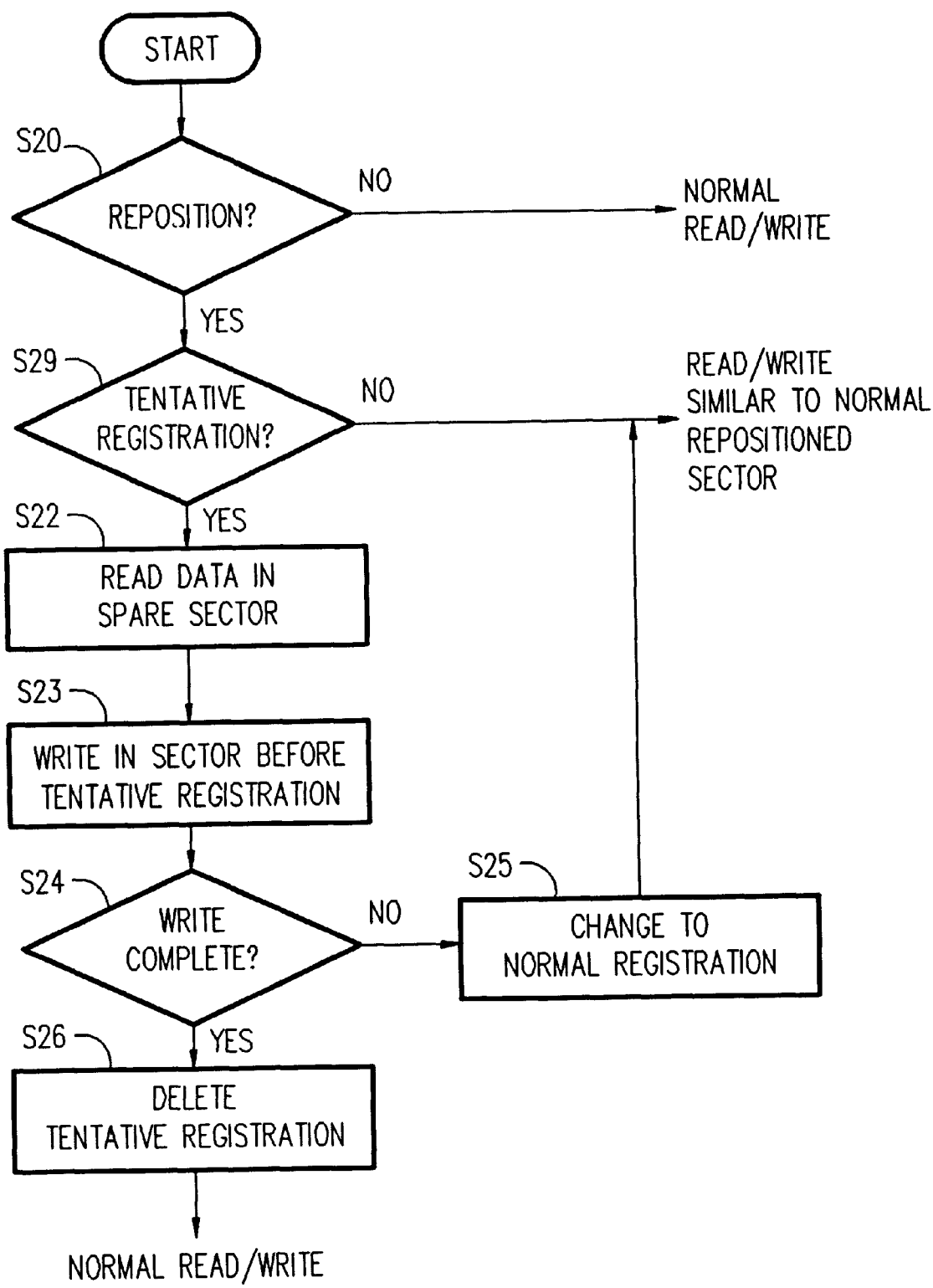
FIG. 4 is a diagram showing the operation for deleting tentative registration.

Specifically, when normal read/write is performed, the controller 3 references the reassignment table as described above in step S20 of the flowchart shown in FIG. 4, confirms whether or not the sector to be read/written is a reassigned sector, if not, completes the process, and starts a normal read/write operation.

On the other hand, if the sector to be read/written is a reassigned sector, the controller 3 proceeds to step S21 where it references the RST flag of the reassignment table, and confirms whether or not the requested sector is a tentatively registered (i.e. tentatively reassigned) sector.

If not, that is, if it is normally registered, the controller completes, and performs read/write to the assigned spare sector. On the other hand, if it is a tentatively registered sector, the controller proceeds to step S22 where it reads data in the corresponding spare sector, and writes in the subsequent step S23 the read-out data in the original sector to which an alternate sector is assigned through tentative registration.

The process in steps S22 and S23 is performed similar to the above ERP until the write operation is successfully performed, or until the write operation is repeated a predetermined number of times or more. If the write operation is unsuccessful for a predetermined number of times or more, the process proceeds to step S25 where it makes the tentative registration of the sector the normal registration of defective sector. Specifically, it turns the flag RST in the reassignment table corresponding to the sector to "0", the flag RE to "1" if it is during reading, and the flag WE to "1" if it is during writing. Since this makes the registration normal, ERP is not executed since then, and read/write is performed for the assigned spare sector.

On the other hand, if write is successful, the process proceeds to step S26 where it deletes data relating to the sector in the reassignment table. This deletes the tentative registration, the sector is treated as a non-defective sector, and the assigned spare sector is also released.

As described, when ERP is executed in accessing a tentatively registered sector, it becomes possible to use as a defect free sector a sector for which a write error has been recovered, but which is tentatively registered as a defective sector because of the reset request. This enables it to prevent the storage capacity of the fixed disk drive from being uselessly reduced. In addition, it is also possible to release a spare sector which is assigned through tentative registration, so that insufficiency of spare sectors and lowering of access speed can be eliminated.

While the above embodiment is described for a case where the present invention is applied to a fixed disk drive, applications of the present invention is not limited to the above-mentioned fixed disk drive, but may be another disk recording medium such as a magneto-optical disk for which the same advantages as that for the above embodiment can be attained.

The disk drive unit and the error recovery method for the disk drive unit according to the present invention performs a first error recovery procedure when a write error is detected with a write error detector, and performs a second error recovery procedure having less execution instructions when a reset instruction is detected by a reset detector, whereby time for error recovery procedure can be reduced when reset is instructed to shorten response time for reset.

We claim:

1. A disk drive unit comprising
a recording medium;
a write controller for writing data at a selected position on the recording medium;
a write error detector for detecting a write error occurring in writing data by said write controller;
a reset detector for detecting whether or not a reset instruction is pending; and
an error recovery processor for executing a reset error recovery procedure when said reset detector detects that a reset instruction is pending and said write error detector detects a write error, the reset error recovery procedure having a shorter execution time than an error recovery procedure executed when the reset detector does not detect that a reset instruction is pending.

2. The disk drive unit as set forth in claim 1, wherein, in the reset error recovery procedure includes assigning an alternate position at which data is written in place of the selected position and writing the data at the alternate position.

3. The disk drive unit as set forth in claim 2, further comprising a cache memory and means for writing selected units in the cache memory to the recording medium when a reset instruction is received.

4. The disk drive unit as set forth in claim 3, wherein the reset error recovery procedure includes:
recording information indicating correspondence between the selected position and the alternate position in a reassignment table when an alternate sector is assigned; and
recording reset information indicating that the alternate position was assigned as a result of a reset instruction.

5. The disk drive unit as set forth in claim 4 wherein the write controller further comprising:
a reset information detector for detecting when a write instruction, for specified data, references the selected position for which the alternate position was assigned; and
reset assignment deleting unit, responsive to the reset information detector, for writing the specified data at the selected position, deleting the reset information and deleting the information indicating correspondence between the selected position and the alternate position in the reassignment table.

6. An error recovery method for a disk drive comprising the steps of:
detecting a write error occurring in writing data at a selected position;
detecting whether or not a reset instruction is pending; and
executing a reset error recovery procedure when the reset instruction is pending and a write error is detected, the reset error recovery procedure having a shorter execution time than an error recovery procedure executed when the reset instruction is not pending.

7. The method of claim 6, wherein, in the reset error recovery procedure includes the steps of assigning an alternate position at which the data is written in place of the selected position and writing the data at the alternate position.

8. The method of claim 7, wherein the disk drive further comprises a cache memory and the method includes writing selected data units in the cache memory to the recording medium when a reset instruction is received and executing the reset error recovery procedure if write errors are detected.

9. The method of claim 8, wherein the reset error recovery procedure includes the steps of:

recording information indicating correspondence between the selected position and the alternate position in a reassignment table when an alternate sector is assigned; and recording reset information indicating that the alternate position was assigned as a result of a reset instruction.

10. The method of claim 9 the method further comprising the step of sending a reset ready signal to an information processing system when there are no more data records in the cache to be written to the recording medium.

11. The method of claim 9 wherein the reset error recovery procedure further comprises the steps of:

detecting when a write instruction, for specified data, references the selected position for which the alternate position was assigned; and responsive to the detecting step, writing the specified data at the selected position, deleting the reset information and deleting the information indicating correspondence between the selected position and the alternate position in the reassignment table.

12. A method of operating a disk drive comprising the steps of:

caching a plurality of data records from a sequentially writing each data record in the cache to be written to a recording medium;

sequentially writing each data record in the cache to the recording medium while monitoring for errors in writing, each data record having an original position on the recording medium; and when an error is detected and a reset instruction is pending, executing an error recovery procedure comprising the steps of:

writing the data record in an alternate position; and recording information linking the alternate position to the original position of the data record.

13. The method of claim 12 further comprising the steps of:

detecting a write instruction, for specified data, which references the original position for which the alternate position was assigned; and responsive to the detecting step:

writing the specified data at the original position;

deleting the reset information; and deleting the information linking the original position to the alternate position.

14. The method of claim 13 wherein the step of sequentially writing each data record in the cache occurs substantially in parallel with reading operations.

15. The method of claim 12 further comprising the step of sending a reset ready signal to the information processing system when there are no more data records in the cache to be written to the recording medium.

* * * * *